(12) United States Patent
Zheng et al.

(10) Patent No.: US 12,044,861 B2
(45) Date of Patent: Jul. 23, 2024

(54) OPTICAL IMAGING FILM

(71) Applicant: SHINE OPTOELECTRONICS (KUNSHAN) CO., LTD., Kunshan (CN)

(72) Inventors: Weiwei Zheng, Kunshan (CN); Su Shen, Kunshan (CN); Haiying Zhang, Kunshan (CN)

(73) Assignee: Shine Optoelectronics (Kunshan) Co., Ltd., Jiangsu (CN)

( * ) Notice: Subject to any disclaimer, the term of this patent is extended or adjusted under 35 U.S.C. 154(b) by 312 days.

(21) Appl. No.: 17/678,106

(22) Filed: Feb. 23, 2022

(65) Prior Publication Data

US 2022/0179227 A1 Jun. 9, 2022

Related U.S. Application Data

(63) Continuation of application No. PCT/CN2020/096558, filed on Jun. 17, 2020.

(30) Foreign Application Priority Data

Aug. 26, 2019 (CN) .......................... 201910791504.2

(51) Int. Cl.
*G02B 27/60* (2006.01)
*B44F 1/04* (2006.01)
(Continued)

(52) U.S. Cl.
CPC .............. *G02B 27/60* (2013.01); *B44F 1/045* (2013.01); *G02B 3/0037* (2013.01); *G02B 3/08* (2013.01)

(58) Field of Classification Search
None
See application file for complete search history.

(56) References Cited

U.S. PATENT DOCUMENTS

2007/0279391 A1* 12/2007 Marttila ................ G06F 3/0238
                                                                         348/E13.028
2014/0367957 A1* 12/2014 Jordan ................. B42D 25/324
                                                                         359/619
(Continued)

FOREIGN PATENT DOCUMENTS

CN          101460914 A      6/2009
CN          101850680 A     10/2010
(Continued)

OTHER PUBLICATIONS

International Search Report from corresponding International Application No. PCT/CN2020/096558, mailed on Sep. 29, 2020, 6 pages.

*Primary Examiner* — Robert E. Tallman
(74) *Attorney, Agent, or Firm* — Tucker Ellis LLP (57) ABSTRACT

An optical imaging film includes: a focusing layer, having two or more focusing structures; and a graphic layer, having two or more sub-graphics, and at least part of the sub-graphics are configured as a partial pattern of a preset graphic. The focusing layer is adapted to the graphic layer, and the focusing structures are provided corresponding to the sub-graphics, such that the optical imaging film presents an image of the preset graphic with a magnifying effect. The graphic layer of the optical imaging film includes a plurality of sub-graphics, and each of the plurality of the sub-graphics interacts with the corresponding focusing structure to form an image with a magnifying effect. Therefore, the sub-graphic is relatively large, thereby increasing the size of the images. That is, the optical imaging film can increase the magnification of the preset graphic.

15 Claims, 7 Drawing Sheets

(51) Int. Cl.
*G02B 3/00* (2006.01)
*G02B 3/08* (2006.01)

(56) References Cited

U.S. PATENT DOCUMENTS

| 2018/0231695 A1* | 8/2018 | Zhang | B42D 25/45 |
| 2019/0152251 A1* | 5/2019 | Schilling | B42D 25/41 |
| 2021/0241658 A1* | 8/2021 | Suyal | G09F 3/0292 |

FOREIGN PATENT DOCUMENTS

| CN | 102858554 A | 1/2013 |
| CN | 108454265 A | 8/2018 |
| CN | 210401718 U | 4/2020 |
| WO | 2005106601 A2 | 11/2005 |

* cited by examiner

OPTICAL IMAGING FILM

CROSS-REFERENCE TO RELATED APPLICATIONS

The present application is a continuation of International Application No. PCT/CN2020/096558, filed on Jun. 17, 2020, which claims priority to Chinese Application No. 201910791504.2, filed on Aug. 26, 2019, the contents of both of which are incorporated herein by reference in their entireties.

TECHNICAL FIELD

The present disclosure relates to the technical field of optical thin film and, in particular, to an optical imaging film.

BACKGROUND

Imaging and display technology has drawn more and more attention. Imaging technology based on micro-lenses has great potential and development prospects due to the advantages of complete parallax, continuous viewpoints, and no need for any observation eyeglasses and special illumination, and gradually becomes the most potential and promising automatic display technology. Imaging is usually achieved by Moire imaging technology to form an optical imaging film. The optical imaging film generally includes a graphic layer and a focusing layer. The graphic layer includes a plurality of micrographics and the focusing layer generally includes a plurality of micro-lenses, and the micro-lenses interact with the graphic layer to form an image with a magnifying effect. Micro-lenses are artificially designed, with a micro-scale or nano-scale size, and a functional structure arranged in a specific manner. The micro-lenses possess characteristics of light weight, high design freedom, and flexible structure, and thus have significant advantages in the field of optical imaging.

However, among the above imaging methods, the size of the formed image is related to the sizes of the micro-lens and the micrographics. However, the sizes of the micrographics or the micro-lens themselves are limited, resulting in a limited size of the formed image. That is, the magnification of the optical imaging film is relatively low.

SUMMARY

In view of this, embodiments of the present disclosure provide an optical imaging film to solve the problem of low magnification of the optical imaging film in the related art.

Embodiments of the present disclosure provide an optical imaging film, including: a focusing layer including two or more focusing structures; and a graphic layer including two or more sub-graphics, at least part of the sub-graphics are configured as a partial pattern of a preset graphic. The focusing layer is adapted to the graphic layer, and the focusing structures are provided corresponding to the sub-graphics, such that the optical imaging film presents an image of the preset graphic with a magnifying effect In an embodiment, each of the sub-graphics corresponds to a different region of the preset graphic.

In an embodiment, each of the sub-graphics presents a different graph.

In an embodiment, each of the sub-graphics has different contents, and/or each of the sub-graphics corresponds to a different position of the preset graphics.

In an embodiment, graph parts presented by adjacent sub-graphics are the same.

In an embodiment, one or more of the sub-graphics is presented as blank.

In an embodiment, in the graphic layer, each of the sub-graphics is configured as a partial pattern of the preset graphic; and partial patterns of at least two of the preset graphics are different from each other.

In an embodiment, the preset graphic is divided into N equal parts, and the partial pattern presented by each sub-graphics is 1/N of the preset graphic.

In an embodiment, the preset graphic is divided into N equal parts, and the partial pattern presented by at least some of the sub-graphics is greater than 1/N of the preset graphic.

In an embodiment, each of the sub-graphics has a center point, and each center point corresponds to a point at a different position of the preset graphic.

In an embodiment, the sub-graphics include one or more of a printing pattern, an embossing pattern, or a filling pattern.

In an embodiment, the focusing structures one-to-one correspond to the sub-graphics; and a distance between the sub-graphics and a focal plane of the focusing structures is 0.7 to 1.3 times of a focal length of the focusing structure.

In an embodiment, the focusing structures are periodically arranged or randomly arranged.

In an embodiment, the optical imaging film includes a polymer layer, along a thickness direction, the sub-graphics are formed on one side of the polymer layer, and the focusing structures are formed on the other side of the polymer layer. Alternatively, the optical imaging film includes a first polymer layer and a second polymer layer, and ends of the first polymer layer and the second polymer layer that are close to each other are fused with each other, the sub-graphics are formed in the first polymer layer, and the focusing structures are formed in the second polymer layer In an embodiment, the optical imaging film further includes a substrate layer, along a thickness direction, the graphic layer is formed on one side of the substrate layer, and the focusing layer is formed on the other side of the substrate layer.

In the present disclosure, the graphic layer of the optical imaging film includes a plurality of sub-graphics, and each of the plurality of the sub-graphics interacts with the corresponding focusing structure to form an image with a magnifying effect. Therefore, compared with the related art, the sub-graphic of the present disclosure is relatively large, such that the size of the images can be increased. That is, the optical imaging film in the present disclosure can increase the magnification of the preset graphic.

BRIEF DESCRIPTION OF DRAWINGS

In order to better illustrate the technical solutions of the embodiments in the present disclosure, the drawings used in the embodiments will be introduced as follows. It is appreciated that, the drawings in the following description are only some embodiments of the present disclosure. For those skilled in the art, other drawings can also be obtained from these drawings without any creative effort.

REFERENCE SIGNS

1—graphic layer.
11—graphic structure.
111—preset graphic.
111a—sub-graphic.
12—first polymer layer.
2—focusing layer.
21—focusing structure.
22—second polymer layer.
3—substrate layer.
4—reflective layer.
5—first protective layer.
6—second protective layer.
7—polymer layer.
81—coloring layer.
82—spacing layer.
83—adhesive layer.
84—base layer.

DESCRIPTION OF EMBODIMENTS

In order to better understand the technical solutions of the present disclosure, the embodiments of the present disclosure will be described in detail below with reference to the drawings.

It should be clear that the described embodiments are merely part of the embodiments of the present disclosure, but not all of the embodiments. Based on the embodiments in the present disclosure, all the other embodiments obtained by those skilled in the art without creative effort fall into the protective scope of the present disclosure.

The terms used in the embodiments of the present disclosure are merely for the purpose of describing certain embodiments, but not the limitations to the present disclosure. The singular form "a/an", "the" and "said" used in the embodiments and the claims in the present disclosure also aim at including the plural forms, unless the context clearly noted otherwise.

It should be understood that the term "and/or" used herein is merely an association relationship to describe the associated objects, which means that there may be three types of relations. For example, A and/or B can mean that A exists alone, A and B exist at the same time, or B exists alone. In addition, the character "/" herein generally indicates that the preceding and succeeding related objects are in an "or" relationship.

It should be noted that the directional words such as "above", "below", "left" and "right" described in the embodiments of the present disclosure are described in the view shown in the drawings, and should not be understood as the limitation of the embodiments of the present disclosure. In addition, in the context, it should also be understood that when an element is referred to as being connected "above" or "below" another element, it means that the element can not only be directly connected "above" or "below" another element, but also indirectly connected "above" or "below" another element through intervening elements.

Figure 1:
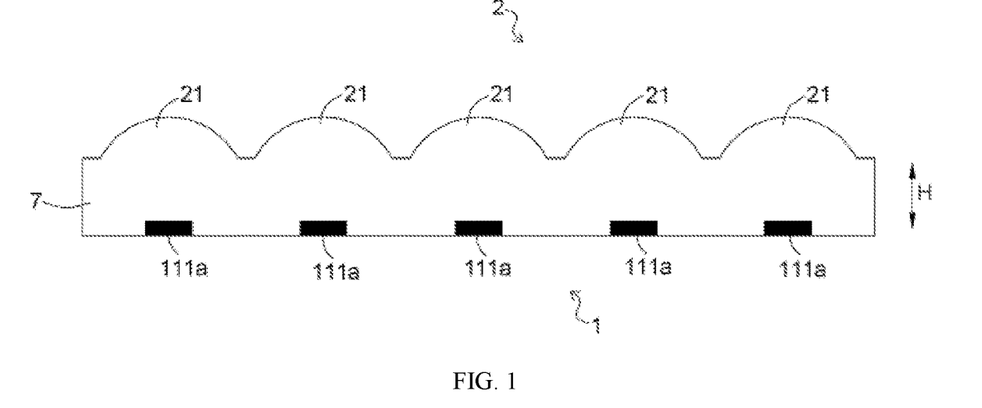
FIG. 1 is a cross-sectional view of an optical imaging film according to a first embodiment of the present disclosure.
Figure 8:
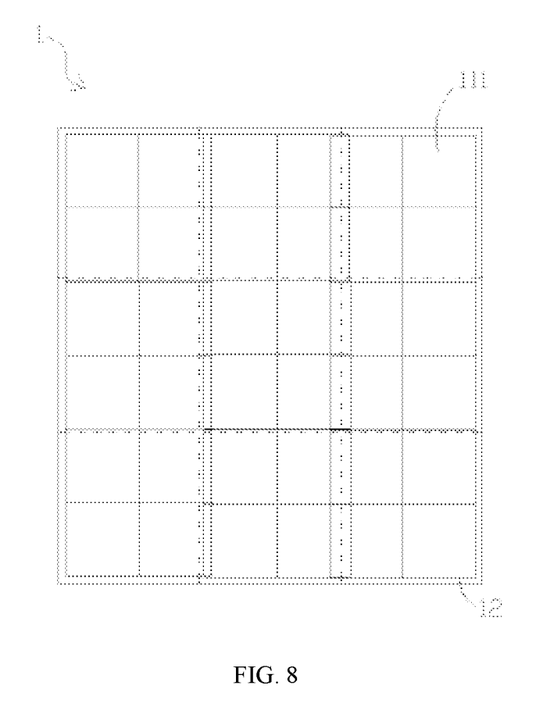
FIG. 8 is a schematic diagram showing arrangement of a preset graphics.

Embodiments of the present disclosure provide an optical imaging film, which can be used as an anti-counterfeiting film, a decorative film, and the like. As shown in FIG. 1, the optical imaging film includes a graphic layer 1 and a focusing layer 2. The graphic layer 1 is used to form a magnified preset graphic 111. For example, in the embodiment shown in FIG. 8, the preset graphic 111 is a Chinese character "山", and under the action of the focusing layer 2, the optical imaging film can present an image of "田", and the image has a magnifying effect.

Figure 9:
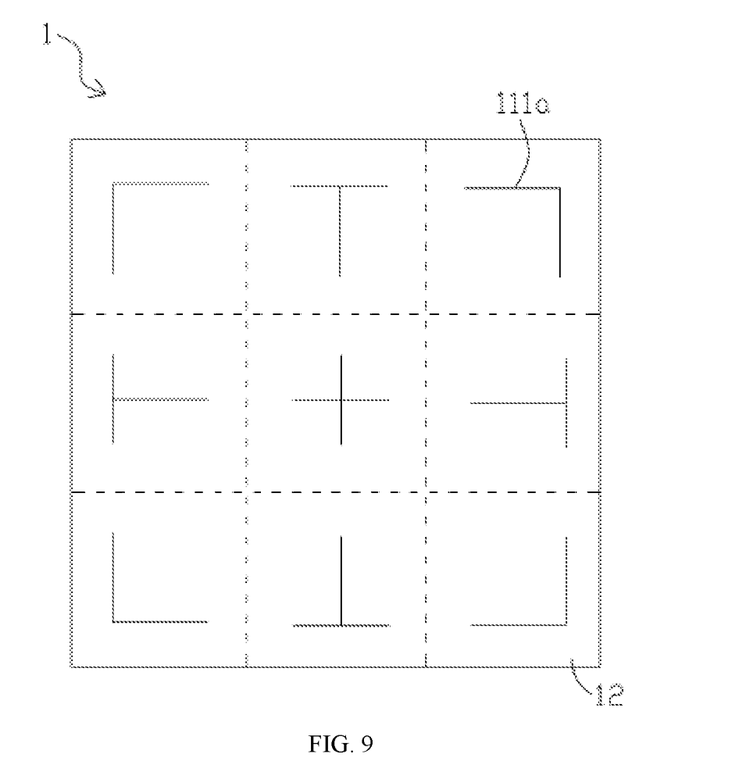
FIG. 9 is a schematic diagram showing arrangement of a sub-graphics of a graphic layer of an optical imaging film according to the present disclosure.
Figure 11:
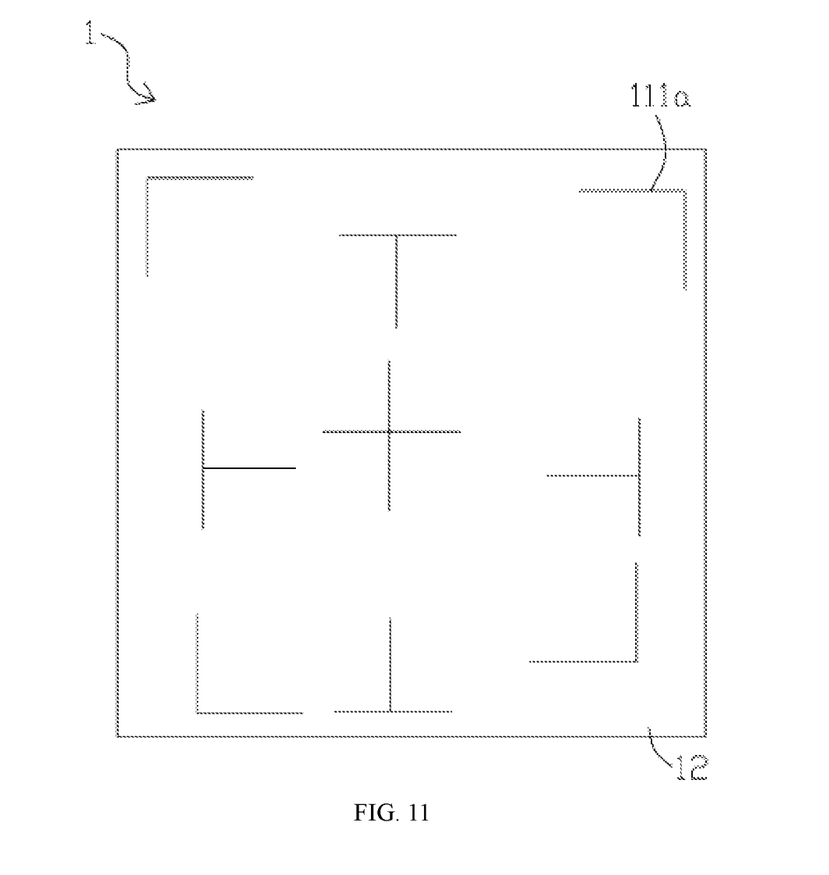
FIG. 11 is a schematic diagram showing arrangement of a sub-graphics of a graphic layer of an optical imaging film according to the present disclosure.

As shown in FIG. 9 and FIG. 11, the graphic layer 1 includes a plurality of sub-graphics 111a, and among the plurality of the sub-graphics 111a, at least part of the sub-graphics 111a are the partial patterns of the preset graphic 111. That is, the plurality of the sub-graphics 111a are all partial patterns of preset graphic 111. Alternatively, part of the sub-graphics 111a are the partial patterns of preset graphic 111, and the other part of sub-graphics 111a are the entire preset graphic 111.

When each of the sub-graphics 111a is partial pattern of preset graphic 111, each of the sub-graphics 111a can be combined to form the above-mentioned preset graphic 111. That is, each of the sub-graphics 111a is equivalent to the structure formed by partitioning the preset graphic 111, respectively. Each of the sub-graphics 111a needs to meet a condition of being capable of forming a complete preset graphic 111. As shown in FIG. 9 and FIG. 11, in the graphic layer 1, the sub-graphics 111a are at intervals.

In the optical imaging film, the sub-graphics 111a one-to-one corresponds to the focusing structures 21 of the focusing layer 2. That is, each focusing structure 21 interacts with the corresponding sub-graphics 111a so as to form an image with magnifying effect according to the Moire imaging principle, and the image is a virtual image. Therefore, the distribution regulation of each sub-graphic 111a is the same as the focus structure 21.

It should be noted that, the Moire imaging principle adopted in the present disclosure is different from the principle of directly magnifying micro-images through a lens (convex lens imaging) in the related art. Please refer to the related art for the Moire imaging principle.

The design idea of the present disclosure is described as follows: in the present Moire imaging technology, the graphic layer 1 is usually provided with a plurality of complete target graphs, and each target graph is located in the periodic unit or within the aperture range of the corresponding focusing structure 21. Therefore, under the action of the plurality of focusing structures 21 of the focusing layer 2, an image with magnifying effect is formed. For example, assuming that the imaging magnification of the focusing structure 21 is 200×, the target graph can be magnified by 200 times through the interaction between the focusing layer 2 and the graphic layer 1, that is, an image with a magnification effect of 200 times is formed. In the present disclosure, the graphic layer 1 includes a plurality of sub-graphics 111a, and under the action of each sub-graphic 111a and the corresponding focusing structure 21, an image with magnifying effect can be formed. Compared with the related art, in the present disclosure, the size of the sub-graphics 111a is close to the size of the complete preset graphic in the related art, such that the preset graphic 111 can be magnified, thereby increasing the size of the image. For example, assuming that the imaging magnification of the focusing structure 21 is 200×, under the condition that the focusing structure 21 remains unchanged, the graphic layer 1 is configured as a plurality of sub-graphics 111a, and the preset graphic 111 corresponding to the sub-graphics 111a is 3 to 5 times of the present target graph. Therefore, after Moire imaging, an image with a magnification of 200×(3~5) times can be formed. Images with larger magnifications can be obtained without changing the height or depth of the images.

In an embodiment, the preset graphic 111 is divided into N equal parts, and in the above-mentioned sub-graphics 111, the partial pattern of each preset graphic is 1/N of the preset graphic 111. Therefore, in this embodiment, after the sub-graphics 111 are combined, there is no overlapping area between the partial patterns of each preset graphic. At this time, the optical imaging film can present the image of preset graphic 111 and has a good imaging effect.

In another embodiment, the preset graphic 111 is divided into N equal parts, and in the above-mentioned sub-graphics 111, at least part of the partial pattern of each preset graphic is greater than 1/N of the preset graphic 111. Therefore, in this embodiment, after the sub-graphics 111 are combined, there is an overlapping area between at least part of the partial pattern of each preset graphic. At this time, the optical imaging film can still present the image of preset graphic 111.

That is, assuming that there are totally n sub-graphics 111a, each sub-graphic 111a of the n sub-graphics 111a may be provided with the equally divided part, and may also be spread out from the center of the equal division to form partial pattern. Moreover, since each sub-graphic 111a includes the equally divided part, when combining, at least one preset graphic 111 can be combined regardless of the overlapping extent.

In addition, the distribution of the preset graphic 111 corresponding to the partial pattern of each sub-graphic 111a is larger than the periodic unit where the sub-graphic 111a is located or larger than the aperture range of the corresponding focusing structure 21. Each sub-graphic 111a actually presents the parts in the period unit corresponding to the preset graphic 111 or within the aperture range of the corresponding focusing structure 21. Thus, the partial pattern of the sub-graphic 111a can be configured with a maximum size as large as the periodic unit area or the aperture range of the corresponding focusing structure 21, or with a minimum size as small as the equally divided part, as well as any intermediate value between the maximum and the minimum. The equally divided part is located at the center of the sub-graphic 111a and is provided directly opposite to the center of the focusing structure 21, such that the sub-graphic 111a directly opposite to the center of each focusing structure 21 is a different equal division. The shape of the partial pattern formed by the diffusion with the equal division as the center can be a circle, a triangle, a square, a rectangle, a trapezoid, a regular hexagon, a special shape, or the like.

Each sub-graphic 111a has a center point, and each center point corresponds to a point at a different position of the preset graphic 111.

In addition, each sub-graphic 111a corresponds to a different region of the preset graphic 111, respectively. That is, the sub-graphics 111a present patterns of different regions of the preset graphic 111.

In an embodiment, the graphs presented by each sub-graphic 111a are different from each other. The difference of the graphs presented by the sub-graphics 111a includes: the contents of the graphs presented by the sub-graphics 111a are different from each other, and/or the positions of the sub-graphics 111a in the preset graphic 111 are different from each other.

In another embodiment, all the graph parts presented by each sub-graphic 111a are the same. That is, in each sub-graphic 111a, there exists at least two sub-graphics 111a presenting the same graph, and the graph parts presented by adjacent sub-graphics 111a are the same.

Among the plurality of sub-graphics 111a, there exists one or more sub-graphics 111a presenting blank. For example, assuming the preset graph is a hollow circle and the sub-graphic 111a is the middle part of the hollow circle, the sub-graphic 111a is blank.

In the above embodiments, the focusing structure 21 is a micro-lens or a Fresnel lens, and each sub-graphic 111a and the corresponding focusing structure 21 are provided one-to-one opposite to each other.

Figure 7:
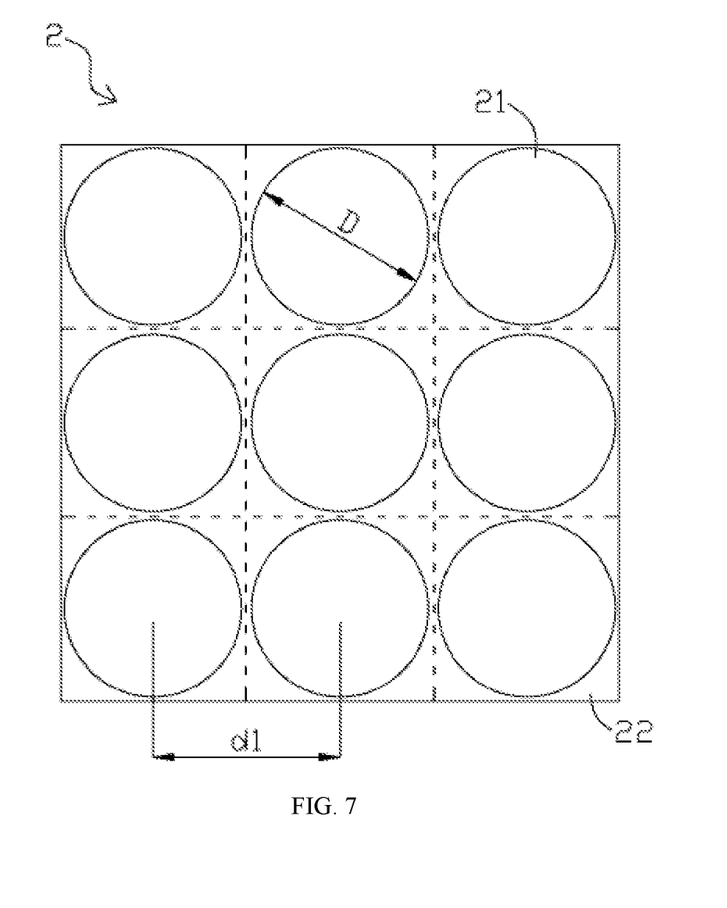
FIG. 7 is a schematic diagram showing arrangement of a focusing structure of a focusing layer of an optical imaging film according to the present disclosure.

In an embodiment, as shown in FIG. 9, the distances d1 between adjacent sub-graphics 111a are the same. That is, the sub-graphics 111a are distributed periodically. As shown in FIG. 7, in the focusing layer 2 of the optical imaging film, the distances between adjacent focusing structures 21 are the same. That is, the focusing structures 21 are distributed periodically.

In an embodiment, the periodically distributed focusing structures 21 and the sub-graphic 111a can form a single image with magnifying effect. In addition, the period of the focusing structures 21 (the distance d1 between adjacent focusing structures 21) is the same as the period of the sub-graphic 111a.

Figure 10:
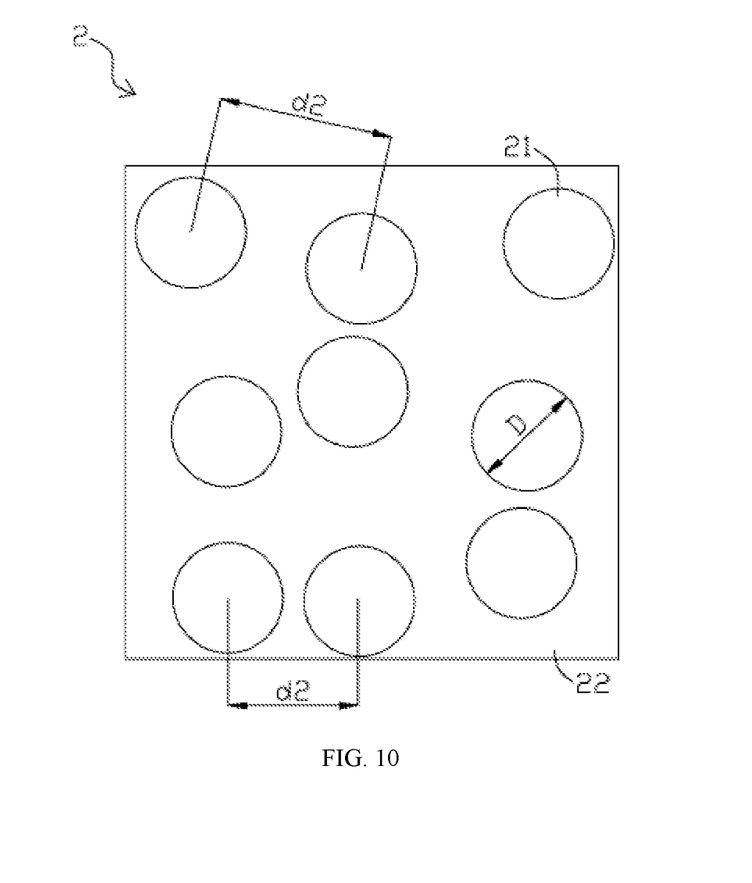
FIG. 10 is a schematic diagram showing another arrangement of a focusing structure of a focusing layer of an optical imaging film according to the present disclosure.

In another embodiment, as shown in FIG. 11, the distance d2 between adjacent sub-graphics 111a is different. That is, the sub-graphics 111a are randomly distributed. As shown in FIG. 10, in the optical imaging film, the distances between the adjacent focusing structures 21 of the focusing layer 2 are different. That is, the focusing structures 21 are randomly distributed, and the random distribution still satisfies the one-to-one correspondence arrangement of the sub-graphics 111a and the focusing structures 21.

In an embodiment, the randomly distributed sub-graphics 111a and focusing structures 21 can form a unique image. For example, the unique floated image, and through the configuration of the sub-graphics 111a, the marginal circle around the floated image can be eliminated, thereby improving the image clarity and quality or the image. It should be noted that, in the optical imaging film, the distribution regulation of the sub-graphics 111a can be determined by the distribution regulation of the focusing structures 21.

It is appreciated that, the shape and size of each sub-graphic 111a may be the same or different, and the size and shape of each sub-graphic 111a are configured according to preset graphic 111.

In the focusing layer 2, the focusing structures 21 are imprinted and solidified in the polymer layer to form a hemispherical or smaller protrusion or depression, and the diameters D of all the focusing structure 21 are the same. In some embodiments, the focusing structures 21 can also be formed by other methods such as etching.

In an embodiment, each focusing structure 21 has the same shape and size, and is a hemispherical protrusion, the diameter of which may be between 20 μm and 1000 μm.

In the above embodiments, in the graphic layer 1, each sub-graphic 111a may include one or more of a printing pattern, an embossing pattern, and a filling pattern.

When the graphic layer 1 is formed, the above-mentioned sub-graphic 111a can be formed by printing on the polymer layer. Alternatively, the corresponding sub-graphic 111a can be imprinted in the polymer layer through a mold.

At the same time, the sub-graphic 111a may further include filler pigments, so that the formed magnified preset graphic has a certain color.

In the above embodiments, the focusing structures 21 one-to-one correspond to the sub-graphics 111a, and the sub-graphics 111a are located at or close to the focal plane of the corresponding focusing structure 21. Therefore, the imaging effect of the focusing structures 21 on the sub-graphics 111a is better. For the lens (focusing structure 21), the focal plane thereof is defined as the plane passing through the focal point and perpendicular to the main optical axis of the system.

It should be noted that the sub-graphics 111a are not strictly located in the focal plane corresponding to the focusing structures 21, and the sub-graphics 111a may be located close to the focal plane corresponding to the focusing structures 21. In an embodiment, the distance between the sub-graphic 111a and the focal plane of the corresponding focusing structure 21 is 0.7-1.3 times of the focal length.

The total thickness of the optical imaging film is between one half of the curvature radius of the focusing structure 21 to three times of the curvature radius of the focusing structure 21. In order to make the focusing structure 21 more adoptable, the effective diameter of the focusing structure 21 may be (20 μm, 1000 μm), (20 μm, 500 μm), (55 μm, 200 μm), or (300 μm, 450 μm). In order to achieve a better imaging effect, the focal length of the focusing structure 21 may be (10 μm, 2000 μm), (20 μm, 100 μm), (200 μm, 450 μm), (550 μm, 900 μm), or (1050 μm, 1500 μm). In order to enlarge the applying arts of the optical imaging film, the total thickness of the optical imaging film is less than 5000 μm, for example, the thickness of the optical imaging film may be (20 μm, 200 μm), which is used in upscale products and those products that require ultra-thin designs. Alternatively, the thickness of the optical imaging film may be (300 μm, 500 μm), which is used for generally small-volume products and in those products without high thickness requirement. Alternatively, the thickness of the optical imaging film may be (600 μm, 1000 μm), or even thicker, such as 1200 μm, 1300 μm, 1500 μm, 2000 μm, 2500 μm, 3500 μm or 4500 μm, etc.

In an embodiment, as shown in FIG. 1, the graphic layer 1 and the focusing layer 2 are formed on the same polymer layer 7. When molding, a plurality of focusing structures 21 are imprinted on one side of the same polymer layer 7 to form the focusing layer 2. At the same time, a plurality of sub-graphics 111a are formed by imprinting and filling the material on the other side of the polymer layer 7 to form the graphic layer 1. Therefore, the optical imaging film is a one-layer film structure. The graphic layer 1 and the focusing layer 2 are of an integrated structure, and there is no structure such as a substrate layer between them, so that the thickness of the optical imaging film can be reduced. The mechanical properties of the integrated optical imaging film are poor, so that the optical imaging film is easily to be cut during hot imprinting.

Figure 2:
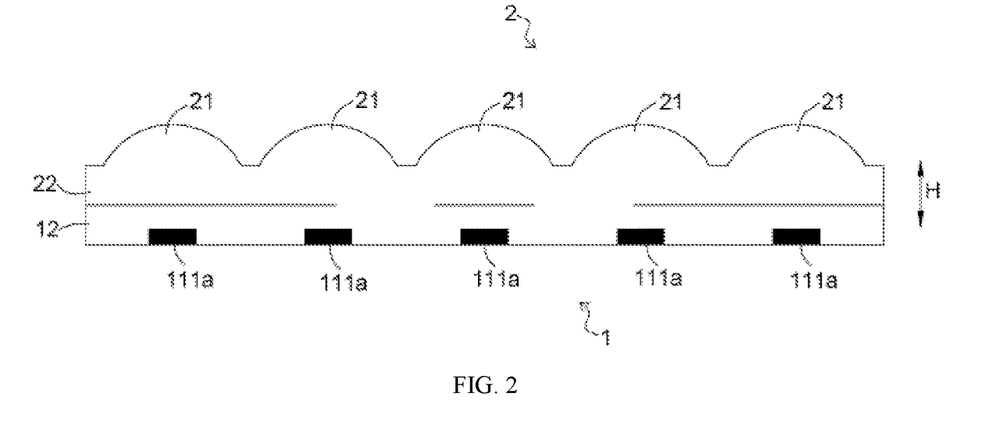
FIG. 2 is a cross-sectional view of an optical imaging film according to a second embodiment of the present disclosure.

Alternatively, as shown in FIG. 2, the optical imaging film includes a first polymer layer 12 and a second polymer layer 22. The sides of the first polymer layer 12 and the second polymer layer 22 that are adhered to each other are fused with each other. The sub-graphics 111a are formed in the first polymer layer 12, and the focusing structures 21 are formed in the second polymer layer 22.

Figure 3:
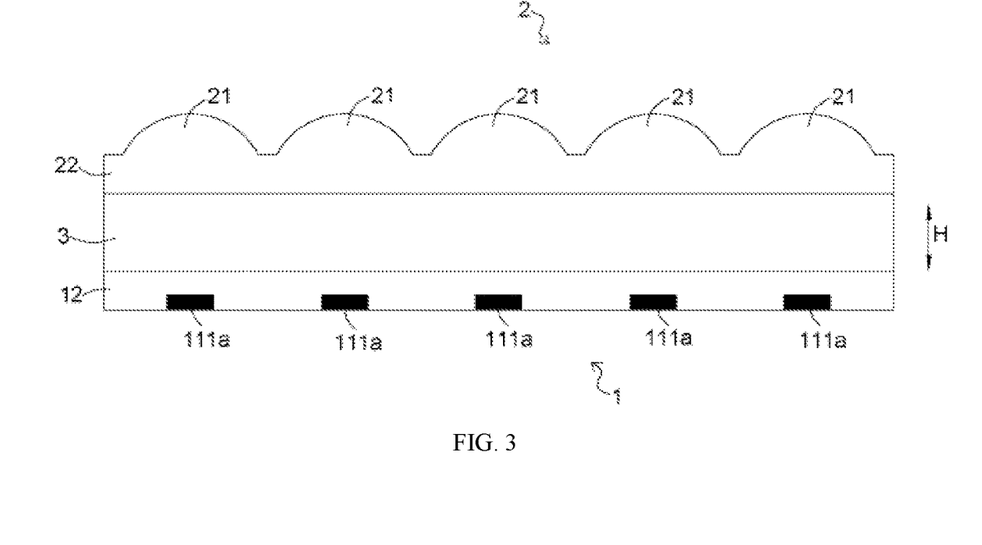
FIG. 3 is a cross-sectional view of an optical imaging film according to a third embodiment of the present disclosure.

In another embodiment, as shown in FIG. 3, in addition to the graphic layer 1 and the focusing layer 2, the optical imaging film also includes a substrate layer 3. Along the thickness direction H, the graphic layer 1 and the focusing layer 2 are located on both sides of the substrate layer 3, respectively. The substrate layer is a polyethylene terephthalate (PET) layer, a polycarbonate (PC) layer, a polyimide (PI) layer, a polymethyl methacrylate (PMMA) layer or a colorless polyimide (CPI) layer.

In an embodiment, in the embodiment shown in FIG. 3, in the optical imaging film, the graphic layer 1 includes the first polymer layer 12, in which the sub-graphics 111a are provided. The focusing layer 2 includes the second polymer layer 22, in which the focusing structure 21 is formed. In addition, the first polymer layer 12 and the second polymer layer 22 are respectively provided on both sides of the substrate layer 3 to form a complete optical imaging film.

Figure 4:
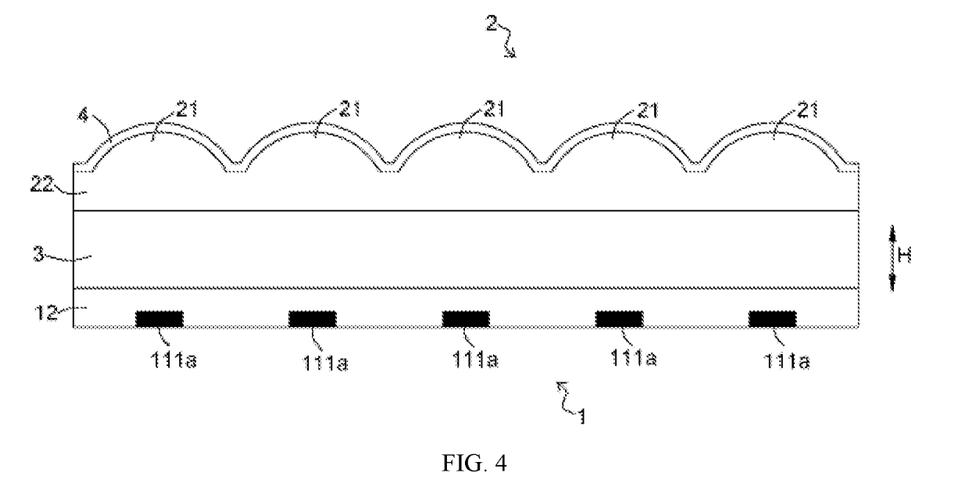
FIG. 4 is a cross-sectional view of an optical imaging film according to a fourth embodiment of the present disclosure.

In another embodiment, as shown in FIG. 4, the optical imaging film further includes a reflective layer 4, which is provided on the outer side of the focusing layer 2. The reflective layer 4 is used to reflect the light entering the optical imaging film, thereby promoting the light to be emitted from the focusing layer 2 and improving the imaging effect.

In this embodiment, the graphic layer 1 and the focusing layer 2 of the optical imaging film may be of an integrated structure. For example, the substrate layer 3 may also be provided between the graphic layer 1 and the focusing layer 2.

Figure 5:
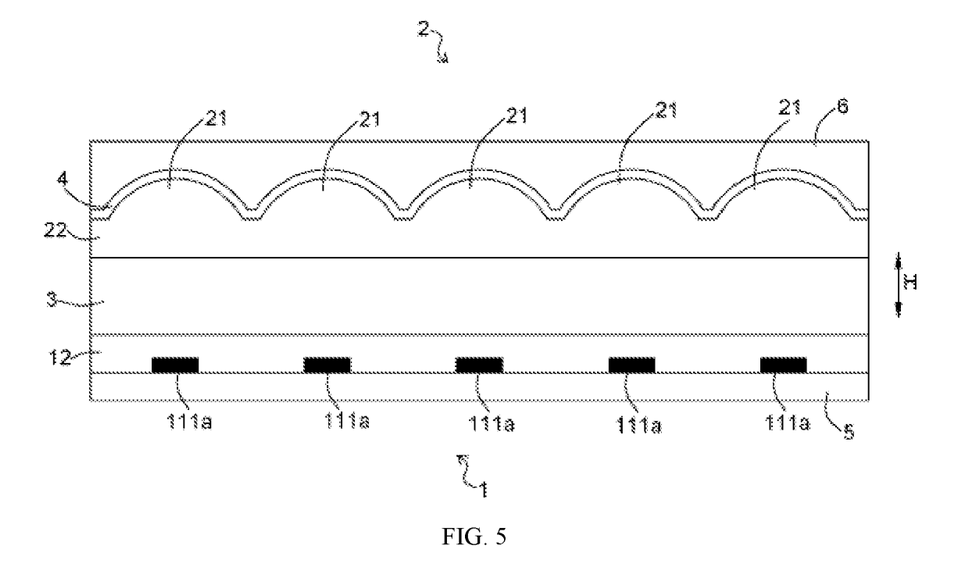
FIG. 5 is a cross-sectional view of an optical imaging film according to a fifth embodiment of the present disclosure.

In another embodiment, as shown in FIG. 5, the optical imaging film may further include a protective layer, and the protective layer is provided on the outer side the graphic layer 1, and/or the protective layer is provided on the outer side the focusing layer 2. For example, the protective layer may include the first protective layer 5 and/or the second protective layer 6.

The first protective layer 5 is provided on the outer side of the graphic layer 1, and/or the second protective layer 6 is provided on the outer side of the focusing layer 2. The first protective layer 5 is configured to provide protection for the graphic layer 1, thereby preventing the deformation of the sub-graphics 111a. The second protective layer 6 can provide protection for the focusing layer 2, thereby preventing the focusing structure 21 from being damaged and improving the lifespan of the optical imaging film.

In an embodiment, the first protective layer 5 can be a transparent ink layer, and the second protective layer 6 can further be used as a coloring layer.

Similarly, the graphic layer 1 and the focusing layer 2 of the optical imaging film in this embodiment can be of an integrated structure. For example, the substrate layer 3 can also be provided between the graphic layer 1 and the focusing layer 2.

Figure 6:
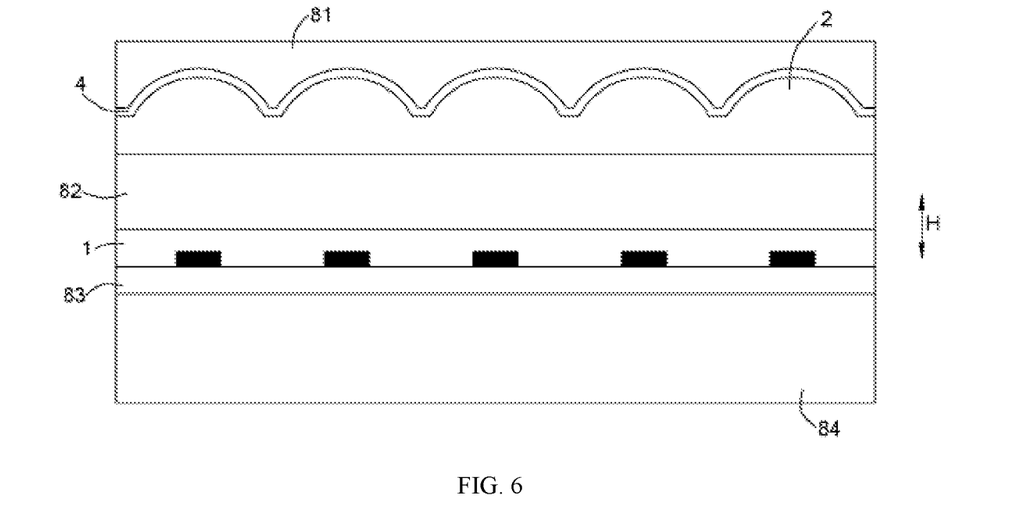
FIG. 6 is a cross-sectional view of an optical imaging film according to a sixth embodiment of the present disclosure.

In another embodiment, as shown in FIG. 6, in addition to the graphic layer 1 and the focusing layer 2, the optical imaging film also includes a reflective layer 4, a spacing layer 82, an adhesive layer 83 and a base layer 84. The reflective layer 4 is provided on the outer side of the focusing layer 2, and the outer side of the reflective layer 4 is provided with a coloring layer 81. The coloring layer 81 may be a material having a certain color. The spacing layer 82 is located between the graphic layer 1 and the focusing layer 2, which is made of transparent materials, such as PET, PC, PI, PMMA or CPI, etc. The above-mentioned graphic layer 1, focusing layer 2, reflective layer 4, and spacing layer 82 form the main body of the optical imaging film, and an adhesive layer 83 is provided at the bottom of the optical imaging film. For example, the adhesive layer 83 can be optical clear adhesive (OCA) glue. The main structure of the optical imaging film can be adhered to the base layer 84 through the adhesive layer 83 so as to form a cover plate of an electronic device, and the base layer 84 is main body of the cover plate. The base layer 84 can be glass, plastic, plexiglass, sapphire or the like. Alternatively, the optical imaging film can also be used in other fields, for example, it can be used in housings of home appliances, various outer packages and various anti-counterfeiting occasions. Alternatively, it can be used for both anti-counterfeiting functions and decoration.

In an embodiment, all the focusing structures 21 are arranged periodically to form the focusing layer 2 as shown in FIG. 7. Correspondingly, all the sub-graphics 111*a* of the graphic layer 1 are also arranged periodically, such that the optical imaging films are capable of forming a magnified image that may be floating and/or sinking.

In another embodiment, all the focusing structures 21 are randomly arranged to form the imaging layer 2 as shown in FIG. 10. Correspondingly, all the sub-graphics 111*a* in the graphic layer 1 are also randomly arranged, such that the optical imaging film is capable of forming a unique image that is floating and/or sinking.

In an embodiment, the optical imaging film includes a polymer layer 7, and the focusing structures 21 are imprinted in the polymer layer 7 on the side along the thickness direction H, so as to form the focusing layer 2. Alternatively, a plurality of focusing structures 21 are etched in the polymer layer 7 on the side along the thickness direction H, so as to form the above-mentioned the focusing layer 2.

The sub-graphics 111*a* are printed in the polymer layer 7 on the other side along the thickness direction H to form the above-mentioned graphic layer 1.

In an embodiment, the reflective layer 4 is provided on the side opposite to the focusing layer 2, that is, the reflective layer 4 is provided on the outer side of the graphic layer 1.

In another embodiment, the first protective layer 5 is provided on the outer side of the focusing layer 2, and/or the second protective layer 6 is provided on the outer side of the graphic layer 1. The first protective layer 5 and/or the second protective layer 6 can protect the graphic layer 1 and/or the focusing layer 2. The first protective layer 5 may be a transparent ink layer, and the second protective layer 6 may be a colored layer.

The above are merely preferred embodiments of the present disclosure, and are not intended to be limitations to the present disclosure. Any modifications, equivalent replacements, improvements, etc. made within the spirit and principles of the present disclosure shall fall into the protection scope of the present disclosure.

What is claimed is:

1. An optical imaging film, comprising:
a focusing layer comprising two or more focusing structures; and
a graphic layer comprising two or more sub-graphics, wherein each of the sub-graphics are configured as a partial pattern of a preset graphic;
wherein the focusing layer is adapted to the graphic layer, and the focusing structures are provided corresponding to the sub-graphics, such that the optical imaging film presents an image of the preset graphic with a magnifying effect.

2. The optical imaging film according to claim 1, wherein each of the sub-graphics corresponds to a different region of the preset graphic.

3. The optical imaging film according to claim 1, wherein each of the sub-graphics presents a different graph.

4. The optical imaging film according to claim 3, wherein each of the sub-graphics has different contents, and/or each of the sub-graphics corresponds to a different position of the preset graphics.

5. The optical imaging film according to claim 1, wherein graph parts presented by adjacent sub-graphics are the same.

6. The optical imaging film according to claim 1, wherein partial patterns of at least two of the preset graphics are different from each other.

7. The optical imaging film according to claim 6, wherein the preset graphic is divided into N equal parts, and the partial pattern presented by each sub-graphics is 1/N of the preset graphic.

8. The optical imaging film according to claim 6, wherein the preset graphic is divided into N equal parts, and the partial pattern presented by at least some of the sub-graphics is greater than 1/N of the preset graphic.

9. The optical imaging film according to claim 1, wherein each of the sub-graphics has a center point, and each center point corresponds to a point at a different position of the preset graphic.

10. The optical imaging film according to claim 1, wherein the sub-graphics comprise one or more of a printing pattern, an embossing pattern, or a filling pattern.

11. The optical imaging film according to claim 1, wherein the focusing structures one-to-one correspond to the sub-graphics; and
wherein a distance between the sub-graphics and a focal plane of the focusing structures is 0.7 to 1.3 times of a focal length of the focusing structure.

12. The optical imaging film according to claim 1, wherein the focusing structures are periodically arranged or randomly arranged.

13. The optical imaging film according to claim 1, wherein the optical imaging film comprises a polymer layer, along a thickness direction, the sub-graphics are formed on one side of the polymer layer, and the focusing structures are formed on the other side of the polymer layer.

14. The optical imaging film according to claim 1, wherein the optical imaging film comprises a first polymer layer and a second polymer layer, and ends of the first polymer layer and the second polymer layer that are close to each other are fused with each other, the sub-graphics are formed in the first polymer layer, and the focusing structures are formed in the second polymer layer.

15. The optical imaging film according to claim 1, further comprising a substrate layer, wherein along a thickness direction, the graphic layer is formed on one side of the substrate layer, and the focusing layer is formed on the other side of the substrate layer.

* * * * *